United States Patent
Kapadia et al.

(10) Patent No.: US 10,741,065 B2
(45) Date of Patent: Aug. 11, 2020

(54) SYSTEMS AND METHODS FOR ENFORCING PLUGIN VEHICLE

(71) Applicant: Ford Global Technologies LLC, Dearborn, MI (US)

(72) Inventors: Jimmy Kapadia, Ottawa, OH (US); Khalid Ahmed, Canton, MI (US); Daniel Lewis Boston, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 16/057,962

(22) Filed: Aug. 8, 2018

(65) Prior Publication Data
US 2020/0051431 A1    Feb. 13, 2020

(51) Int. Cl.
G08G 1/015    (2006.01)
G08G 1/017    (2006.01)
G06K 9/62     (2006.01)

(52) U.S. Cl.
CPC .......... G08G 1/0175 (2013.01); G08G 1/015 (2013.01); *G06K 9/6215* (2013.01); *G06K 2209/23* (2013.01)

(58) Field of Classification Search
CPC ..... G08G 1/0175; G08G 1/015; G06K 9/6215
USPC ....................................... 340/932.2
See application file for complete search history.

(56) References Cited

U.S. PATENT DOCUMENTS

| 9,472,045 B2 | 10/2016 | Halnais et al. |
| 9,666,075 B2 | 5/2017 | Davies et al. |
| 2011/0093314 A1* | 4/2011 | Redmann ............ G06Q 20/127 705/13 |
| 2014/0214499 A1* | 7/2014 | Hudson ................ G07F 17/246 705/13 |
| 2014/0344026 A1 | 11/2014 | Outwater et al. |
| 2014/0372155 A1* | 12/2014 | Wang .................... G06Q 10/02 705/5 |
| 2015/0138001 A1* | 5/2015 | Davies .................. G08G 1/149 340/932.2 |
| 2016/0335727 A1* | 11/2016 | Jimenez ................ G06Q 40/08 |
| 2017/0274789 A1* | 9/2017 | Ma ...................... B60L 11/1835 |
| 2017/0318922 A1* | 11/2017 | Gharabegian .......... A45B 23/00 |
| 2017/0323227 A1 | 11/2017 | Sadeghi |
| 2017/0372529 A1* | 12/2017 | Gopalakrishnan ..... G07B 15/02 |
| 2018/0058085 A1* | 3/2018 | Katanoda .............. B60L 11/182 |
| 2018/0111493 A1* | 4/2018 | Chan .................. B60L 11/1838 |
| 2018/0211122 A1* | 7/2018 | Amico ............... G06K 9/00832 |

FOREIGN PATENT DOCUMENTS

| CN | 105427617 B | 12/2015 |
| JP | 2016131432 A | 1/2015 |

* cited by examiner

*Primary Examiner* — Kam Wan Ma
(74) *Attorney, Agent, or Firm* — David B. Kelley

(57) ABSTRACT

Systems and methods for enforcing plugin vehicle parking regulations are disclosed. Exemplary implementations may: capture parked vehicle images of a parked vehicle in a parking location from a plurality of cameras on electric vehicle service equipment systems (EVSEs) in a parking facility; compare the parked vehicle images to a plurality of plugin vehicle type images in a database; and sound an alarm if the parked vehicle is not a plugin vehicle or if the parked vehicle is not charging from the electric vehicle service equipment systems associated with the parking location within a predetermined time.

13 Claims, 6 Drawing Sheets

SYSTEMS AND METHODS FOR ENFORCING PLUGIN VEHICLE

FIELD OF THE DISCLOSURE

The present disclosure relates to systems and methods for enforcing plugin electric vehicle parking regulations.

BACKGROUND

As the number of plug-in hybrids and electric vehicles increase, so does the need for enhanced electric vehicle service equipment (EVSE) systems. With the increase in EVSE systems, there is a need to be able to enforce plugin vehicle parking regulations. One of the many advantages of plugin vehicles is that they can recharge at workplaces and retail centers, often free of charge. However, it can be frustrating when a driver approaches a designated plug-in charging parking location and finds that a plug-in vehicle is parked there, but is not plugged in; or that a conventional gas-powered vehicle with no ability to plug in has occupied the parking location. These occurrences reduce the confidence that plugin owners will be able to reliably find charging solutions outside of the home and harm the experience of plug-in ownership. Additionally, vehicles occupying the parking location who are unaware of the conditions associated to parking there, may be frustrated in the case they are ticketed as it may not have been clear to them that the parking location was reserved for plugging in. Lastly, charging station or EVSE owners and businesses who install this equipment and designate parking locations for charging want to incentivize people to use them correctly, and when they are misused or are not charging vehicles they are reducing the impact of their investment in electric vehicle charging infrastructure. Therefore, there is a need to enforce plug-in vehicle parking regulations.

SUMMARY

One aspect of the present disclosure relates to a system configured for enforcing plugin vehicle parking regulations. The system may include one or more hardware processors configured by machine-readable instructions. The processor(s) may be configured to capture parked vehicle images of a parked vehicle in a parking location, which is an EVSE parking space, from a plurality of image capture devices located in a parking facility, which is a parking lot or parking structure, in close proximity to each other. The plurality of image capture devices are attached to a group of EVSEs or the parking facility. The group of EVSE systems are networked and have a local connection with other EVSEs in their charging group in order to share their visual imagery. The processor(s) may be configured to compare the parked vehicle images to a plurality of plugin vehicle type images in a database. The processor(s) is configured with a learning algorithm, so as more parked vehicle images are captured it improves the algorithm. It gets confirmation of a plugin vehicle when the EVSE is activated, so if images are captured of a parked vehicle occupying a parking location and that EVSE begins to dispense power it will positively identify that parked vehicle is a plugin. It will then update the database by adding the captured images from the image capture devices. Further, if the processor(s) identifies that the parked vehicle is able to charge, then it will begin a countdown from a predetermined number of seconds informing the driver to plugin their parked vehicle within a designated time. In addition, the processor(s) is configured to sound an alarm or have the screen flash on the EVSE if the parked vehicle is not a plugin vehicle or if the parked vehicle is not charging from the EVSE systems associated with the parking location within a predetermined time.

Another aspect of the present disclosure relates to a method for enforcing plugin vehicle parking regulations. The method may include capturing parked vehicle images of a parked vehicle in a parking location from a plurality of image capturing devices in a parking facility, which is a parking lot or parking structure, in close proximity to each other. The plurality of image capture devices are attached to a group of EVSEs or the parking facility. The group of EVSE systems are networked and have a local connection with other EVSEs in their charging group in order to share their visual imagery. The method includes comparing the parked vehicle images to a plurality of plugin vehicle type images in a database. The method may include processor(s) configured with a learning algorithm, so as more parked vehicle images are captured, it improves the algorithm. It gets confirmation of a plugin vehicle when the EVSE is activated, so if images are captured of a parked vehicle occupying a parking location and that EVSE begins to dispense power it will positively identify that parked vehicle is a plugin. It will then update the database by adding the captured images from the image capture devices. Further, if the processor(s) identifies that the parked vehicle is able to charge, then it will begin a countdown from a predetermined number of seconds informing the driver to plug in their parked vehicle within a designated time. The method may also include broadcasting an alarm or flashing the screen of the EVSE if the parked vehicle is not a plugin vehicle or if the parked vehicle is not charging from the electric vehicle service equipment systems associated with the parking location within a predetermined time.

Yet another aspect of the present disclosure relates to a non-transient computer-readable storage medium having instructions embodied thereon, the instructions being executable by one or more processors to perform a method for enforcing plugin vehicle parking regulations. The method may include capturing parked vehicle images of a parked vehicle in a parking location from a plurality of image capturing devices in a parking facility. The method may include that the plurality of image capturing devices are attached to a group of EVSEs in close proximity or the parking facility. The method may include comparing the parked vehicle images to a plurality of plugin vehicle type images in a database. The method may include instructions being executable by one or more hardware processors that include a learning algorithm that receives confirmation that a plugin vehicle occupies the parking location when the EVSE is activated and updates the database by adding the captured images from the group of EVSEs. The method may include broadcasting an alarm or flashing the screen of the EVSE if the parked vehicle is not a plugin vehicle or if the parked vehicle is not charging from the electric vehicle service equipment systems associated with the parking location within a predetermined time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
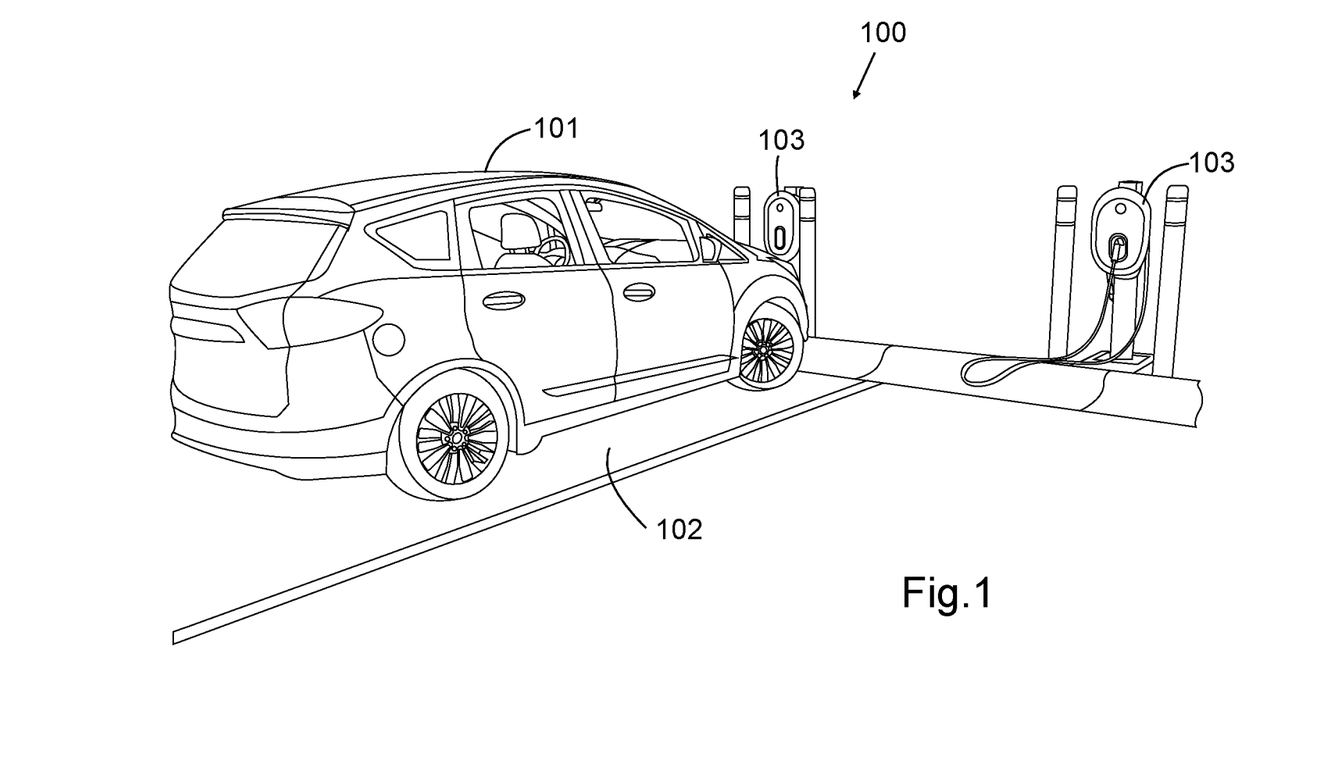
FIG. 1. illustrates a parked vehicle in a parking location in a parking facility, in accordance with one or more implementations.

FIG. 1 illustrates a parked vehicle 101 in a parking location 102, which is an EVSE parking space located in a parking facility 100, which is a parking lot or parking structure containing a group of EVSE systems 103 in close proximity to each other. The group of EVSE systems 103 are networked and have a local connection with other EVSEs in their charging group in order to share their visual imagery.

Figure 2:
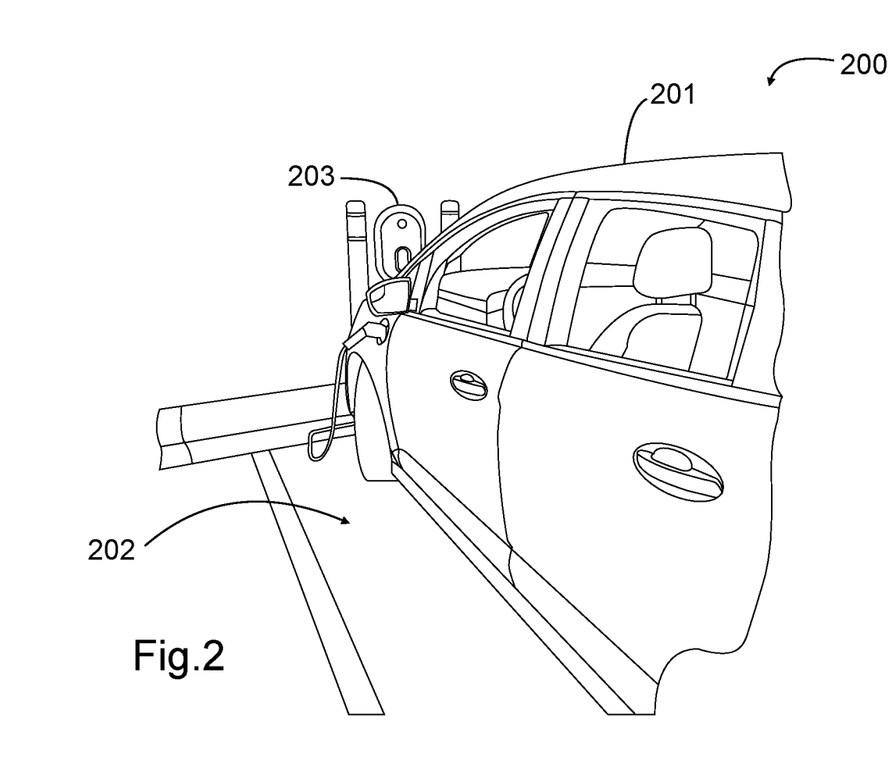
FIG. 2. illustrates a parked charge receiving vehicle receiving a charge from a EVSE unit, in accordance with one or more implementations.

FIG. 2 illustrates a parked vehicle 201 in a parking location 202, which is an EVSE parking space located in a parking facility 200, which is a parking lot or parking structure. The parked vehicle is a charge-receiving vehicle 201 capable of receiving a charge from an EVSE unit 203 linked to a group of EVSEs in the parking facility 200.

Figure 3:
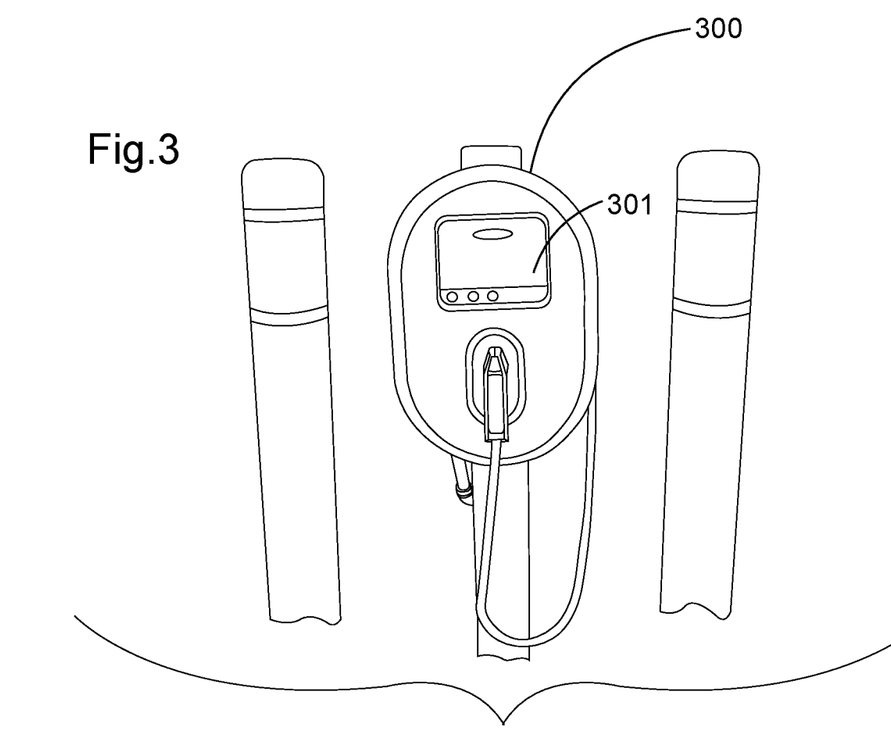
FIG. 3. illustrates an EVSE unit, in accordance with one or more implementations.

FIG. 3 illustrates an EVSE system 300 configured to broadcast an alarm or flash the screen 301 of the EVSE 300 if a parked vehicle is not a plugin vehicle or if the parked vehicle is not charging from the EVSE system associated with the parking location within a predetermined time.

Figure 4:
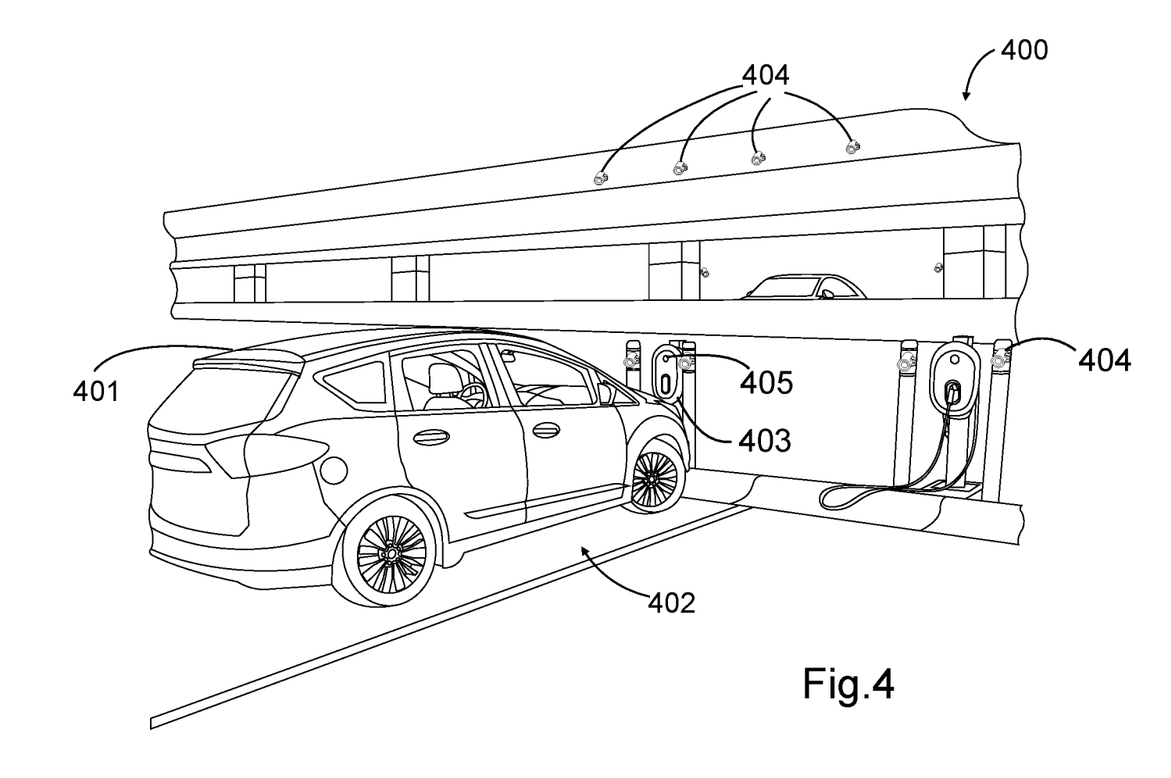
FIG. 4. illustrates a plurality of image capturing devices attached to a group of EVSEs and a parking facility, in accordance with one or more implementations.

FIG. 4 illustrates a parking facility 400 configured for enforcing plugin vehicle parking regulation. The parking facility 400 is configured with a system 500 (FIG. 5) that includes processor(s) 501 (FIG. 5) that may be configured to capture parked vehicle images of a parked vehicle 401 in a parking location 402, which is an EVSE parking space, from a plurality of image capture devices 404 located in a parking facility 400, which is a parking lot or parking structure. The plurality of image capturing devices 404 are attached to a group of EVSEs 403 or the parking facility 400 in close proximity to each other. The group of EVSE systems 403 are networked and have a local connection with other EVSEs in their charging group in order to share their visual imagery. The processor(s) 501 (FIG. 5) may be configured to compare the parked vehicle images to a plurality of plugin vehicle type images in a database. The processor(s) 501 (FIG. 5) is configured with a learning algorithm, so as more parked vehicle images are captured it improves the algorithm. It gets confirmation of a plugin vehicle when the EVSE 403 is activated, so if images are captured of a parked vehicle 401 occupying a parking location 402 and that EVSE 403 begins to dispense power it will positively identify that parked vehicle 401 is a plugin. It will then update the database by adding the captured images from the image capture devices 404. Further, if the processor(s) 501 (FIG. 5) identifies that the parked vehicle 401 is able to charge, then it will begin a countdown from a predetermined number of seconds informing the driver to plug in their parked vehicle 401 within a designated time. In addition, the processor(s) 501 (FIG. 5) is configured to sound an alarm or have the screen 405 flash on the EVSE if the parked vehicle 401 is not a plugin vehicle or if the parked vehicle 401 is not charging from the EVSE units 403 associated with the parking location 402 within a predetermined time.

Figure 5:
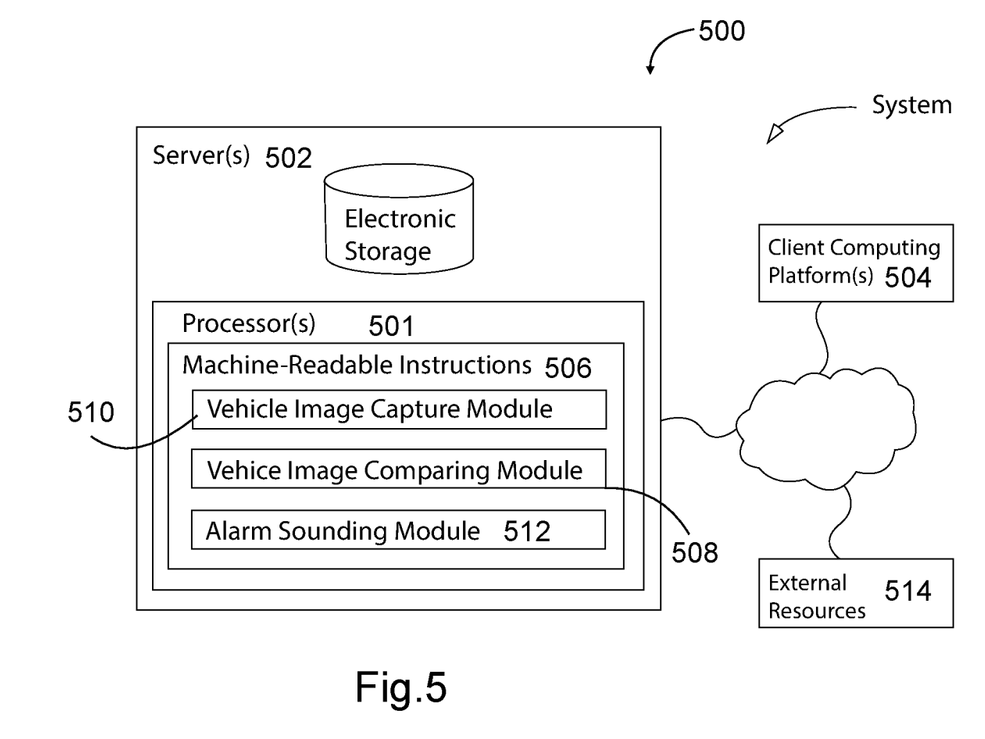
FIG. 5. illustrates a system configured with one or more processors configured by machine-readable instructions that include a vehicle image capture module, image comparing module and an alarm sounding module, in accordance with one or more implementations

FIG. 5 illustrates a system 500 configured for enforcing plugin vehicle parking regulations, in accordance with one or more implementations. In some implementations, system 500 may include one or more servers 502. Server(s) 502 may be configured to communicate with one or more client computing platforms 504 according to a client/server architecture and/or other architectures. Client computing platform(s) 504 may be configured to communicate with other client computing platforms via server(s) 502 and/or according to a peer-to-peer architecture and/or other architectures. Users may access system 500 via client computing platform (s) 504.

Server(s) 502 may be configured by machine-readable instructions 506. Machine-readable instructions 506 may include one or more instruction modules. The instruction modules may include computer program modules. The instruction modules may include one or more of a vehicle image capture module 508, a vehicle image comparing module 510, an alarm sounding module 512, and/or other instruction modules.

Vehicle image capture module 508 may be configured to capture parked vehicle images of a parked vehicle in a parking location from a plurality of cameras in a parking facility.

Vehicle image comparing module 510 may be configured to compare the parked vehicle images to a plurality of plugin vehicle type images in a database. By way of non-limiting example, the plugin vehicle type images in the database may contain a collection of pictures labeled by the vehicle make, model and year. The EVSEs may be networked in order to download the latest versions of the plugin vehicle type images.

Alarm sounding module 512 may be configured to sound an alarm or flash the EVSE screen if the parked vehicle is not a plugin vehicle or if the parked vehicle is not charging from the EVSE associated with the parking location within a predetermined time. The predetermined time may be 30 seconds.

In some implementations, server(s) 502, client computing platform(s) 504, and/or external resources 514 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 502, client computing platform(s) 504, and/or external resources 514 may be operatively linked via some other communication media.

A computing platform 504 may include one or more processors configured to execute computer program modules. The computer program modules may be configured to enable an expert or user associated with the given client computing platform 504 to interface with system 500 and/or external resources 514, and/or provide other functionality attributed herein to client computing platform(s) 504. By way of non-limiting example, the given client computing platform 504 may include one or more of a desktop computer, a laptop computer, a handheld computer, a tablet computing platform and a Smartphone and/or other computing platforms.

External resources 514 may include sources of information outside of system 500, external entities participating with system 500, and/or other resources. In some implementations, some or all of the functionality attributed herein to external resources 514 may be provided by resources included in system 500.

Server(s) 502 may include electronic storage 516, one or more processors 501, and/or other components. Server(s) 502 may include communication lines, or ports to enable the exchange of information with a network and/or other computing platforms. Illustration of server(s) 502 in FIG. 5 is not intended to be limiting. Server(s) 502 may include a plurality of hardware, software, and/or firmware components operating together to provide the functionality attributed herein to server(s) 502. For example, server(s) 502 may be implemented by a cloud of computing platforms operating together as server(s) 502.

Electronic storage 516 may comprise non-transitory storage media that electronically stores information. The electronic storage media of electronic storage 516 may include one or both of system storage that is provided integrally (i.e., substantially non-removable) with server(s) 502 and/or removable storage that is removably connectable to server(s) 502 via, for example, a port (e.g., a USB port, a firewire port, etc.) or a drive (e.g., a disk drive, etc.). Electronic storage 516 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 516 may include one or more virtual storage resources (e.g., cloud storage, a virtual private network, and/or other virtual storage resources). Electronic storage 516 may store software algorithms, information determined by processor(s) 501, information received from server(s) 502, information received from client computing platform(s) 504, and/or other information that enables server(s) 502 to function as described herein.

Processor(s) 501 may be configured to provide information processing capabilities in server(s) 502. As such, processor(s) 501 may include one or more of a digital processor, an analog processor, a digital circuit designed to process information, an analog circuit designed to process information, a state machine, and/or other mechanisms for electronically processing information. Although processor(s) 501 is shown in FIG. 5 as a single entity, this is for illustrative purposes only. In some implementations, processor(s) 501 may include a plurality of processing units. These processing units may be physically located within the same device, or processor(s) 501 may represent processing functionality of a plurality of devices operating in coordination. Processor(s) 501 may be configured to execute modules 508, 510, and/or 512, and/or other modules. Processor(s) 501 may be configured to execute modules 508, 510, and/or 512, and/or other modules by software; hardware; firmware; some combination of software, hardware, and/or firmware; and/or other mechanisms for configuring processing capabilities on processor(s) 132. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, and/or 512 are illustrated in FIG. 5 as being implemented within a single processing unit, in implementations in which processor(s) 501 includes multiple processing units, one or more of modules 508, 510, and/or 512 may be implemented remotely from the other modules. The description of the functionality provided by the different modules 508, 510, and/or 512 described below is for illustrative purposes, and is not intended to be limiting, as any of modules 508, 510, and/or 512 may provide more or less functionality than is described. For example, one or more of modules 508, 510, and/or 512 may be eliminated, and some or all of its functionality may be provided by other ones of modules 508, 510, and/or 512. As another example, processor(s) 501 may be configured to execute one or more additional modules that may perform some or all of the functionality attributed below to one of modules 508, 510, and/or 512.

Figure 6:
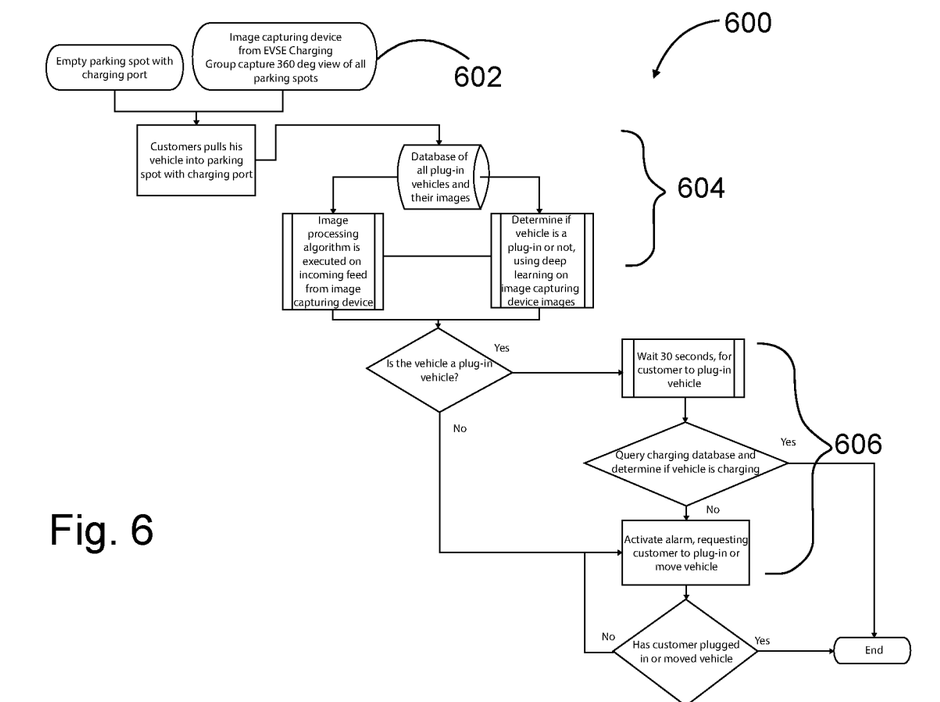
FIG. 6 illustrates a method for enforcing plugin vehicle parking regulations, in accordance with one or more implementations.

FIG. 6 illustrates a method 600 for enforcing plugin vehicle parking regulations, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include capturing parked vehicle images of a parked vehicle in a parking location from a plurality of cameras on EVSEs in a parking facility. Operation 602 may be performed by one or more hardware processors configured by machine-readable instructions including a module that is the same as or similar to vehicle image capture module 508, in accordance with one or more implementations.

An operation 604 may include comparing the parked vehicle images to a plurality of plugin vehicle type images in a database. Operation 604 may be performed by one or more hardware processors configured by machine-readable instructions including a module that is the same as or similar to vehicle image comparing module 510, in accordance with one or more implementations.

An operation 606 may include sounding an alarm if the parked vehicle is not a plugin vehicle or if the parked vehicle is not charging from the EVSE associated with the parking location within a predetermined time. Operation 606 may be performed by one or more hardware processors configured by machine-readable instructions including a module that is the same as or similar to alarm sounding module 512, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for enforcing plugin vehicle parking regulations, the system comprising:
one or more hardware processors configured by machine-readable instructions to:
capture parked vehicle images of a parked vehicle in a parking location from a plurality of image capture devices in a parking facility;
compare the parked vehicle images to a plurality of plugin vehicle type images;
initiate an alert if the parked vehicle is not charging within a predetermined time;
wherein the plugin vehicle type images are in a database containing a collection of pictures identified by vehicle make, model and year; and
wherein the one or more hardware processors include a learning algorithm which receives confirmation that a plugin vehicle occupies the parking location when an electric vehicle service equipment (EVSE) is activated and updates the database by adding the captured images from the parking facility containing a group of EVSEs.

2. The system of claim 1, wherein the parked vehicle is a non-charge receiving vehicle or a charge-receiving vehicle capable of receiving a charge from an EVSE unit linked to the group of EVSEs in the parking facility.

3. The system of claim 2, wherein the plurality of image capture devices are attached to the group of EVSEs or parking facility.

4. The system of claim 2, wherein the group of EVSEs are in close proximity and networked in order to download the latest versions of the plugin vehicle type images.

5. The system of claim 1, wherein the parking facility is a parking lot or parking structure.

6. The system of claim 1, wherein the parking location is an EVSE space in the parking facility.

7. The system of claim 1, wherein the alert is an audible alarm, or a visual alarm that flashes the EVSE screen.

8. A method for enforcing plugin vehicle parking regulations, comprising:
capturing parked vehicle images of a parked vehicle in a parking location from a plurality of image capturing devices in a parking facility, wherein the parked vehicle is a non-charge receiving vehicle or a charge-receiving vehicle capable of receiving a charge from an electric vehicle service equipment (EVSE) unit linked to a group of EVSEs in the parking facility;
comparing the parked vehicle images to a plurality of plugin vehicle type images in a database, wherein the comparing is completed via one or more hardware processors that include a learning algorithm that receives confirmation that a plugin vehicle occupies the parking location when the EVSE unit is activated and updates the database by adding the captured images from the parking facility containing the group of EVSEs; and
broadcasting an alert if the parked vehicle is not a plugin vehicle or if the parked vehicle is not charging within a predetermined time.

9. The method of claim 8, wherein the plugin vehicle type images are in a database containing a collection of pictures identified by vehicle make, model and year.

10. The method of claim 8, wherein the plurality of image capturing devices are attached to the group of EVSEs or the parking facility.

11. The method of claim 8, wherein the group of EVSEs are in close proximity and networked in order to download the latest versions of the plugin vehicle type images.

12. The method of claim 8, wherein broadcasting the alert includes an audible alarm, or a visual alarm that flashes the EVSE screen.

13. A non-transitory computer-readable storage medium having instructions embodied thereon, the instructions being executable by one or more hardware processors processors to perform a method for enforcing plugin vehicle parking regulations, the method comprising:
capturing parked vehicle images of a parked vehicle in a parking location from a plurality of image capturing devices in a parking facility, wherein the plurality of image capturing devices are attached to a group of electric vehicle service equipment (EVSEs) in close proximity or the parking facility;
comparing the parked vehicle images to a plurality of plugin vehicle type images in a database;
broadcasting an alert if the parked vehicle is not a plugin vehicle or if the parked vehicle is not charging within a predetermined time; and
wherein the instructions being executable by the one or more hardware processors include a learning algorithm that receives confirmation that a plugin vehicle occupies the parking location when the EVSE is activated and updates the database by adding the captured images from the group of EVSEs.

* * * * *